Jan. 16, 1962     J. A. MARLAND     3,017,002
ONE-WAY CLUTCH
Filed July 5, 1957
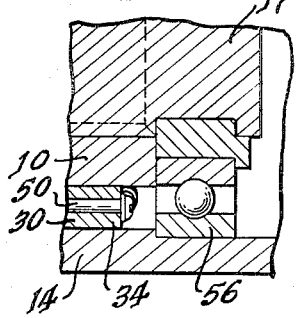
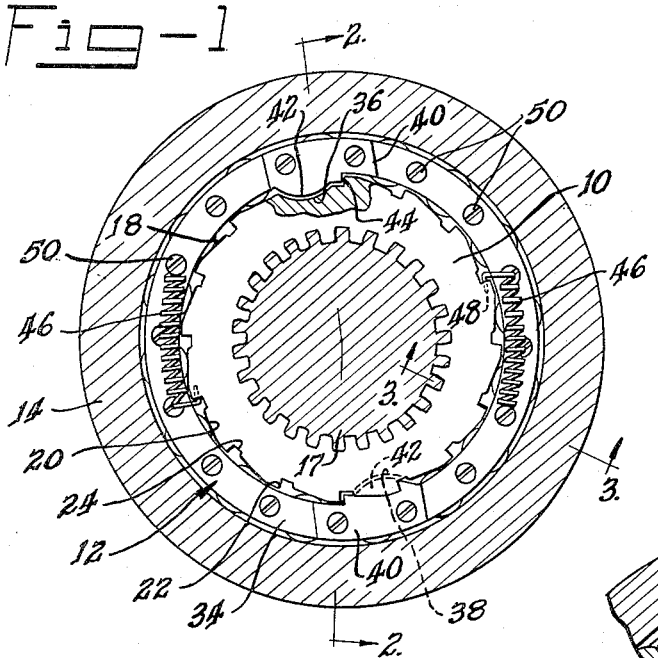
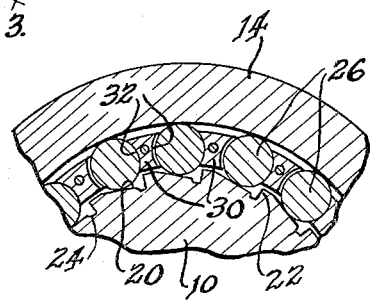
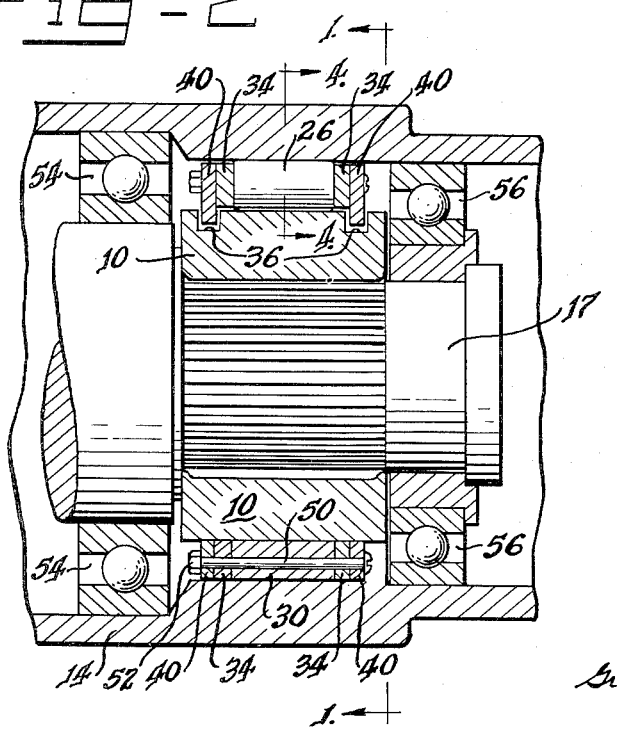
Inventor
Joseph A. Marland
By:
Graf, Thierman & Burmeister
Attorneys United States Patent Office 3,017,002
Patented Jan. 16, 1962

3,017,002
ONE-WAY CLUTCH
Joseph A. Marland, La Grange, Ill., assignor to Marland One-Way Clutch Co., La Grange, Ill.
Filed July 5, 1957, Ser. No. 670,095
4 Claims. (Cl. 192—45)

The present invention relates to one-way clutches for use in mechanical couplers, unidirectional backstops, and the like.

In one type of one-way clutch, roller bearings are disposed between coaxial inner and outer races. One of the races is provided with an indentation which forms an inclined plane confronting each roller bearing, so that rotation of this race relative to the other race results in engagement of the roller bearings between the inclined planes and the other race, thereby locking the clutch to further rotation in this direction. On the other hand, rotation in the opposite direction is not substantially impeded since the roller bearings will be disposed in the deepest portions of the indentations, thus permitting rotation of the roller bearings and the two races relative to each other.

The roller bearings are generally mounted in a roller cage assembly, and the roller cage assembly is generally provided with end rings which confront opposite sides of one of the races in order to maintain the roller bearing assembly in alignment with the inner and outer race. Friction between the end rings and the confronting race reduces the free wheeling of the clutch in its direction of rotation. It is one of the objects of the present invention to provide a one-way roller bearing clutch in which the friction in the direction of rotation is minimized.

Another cause of friction in the direction of rotation in a one-way roller bearing clutch is that a wedge of oil develops in front of each of the roller bearings of the clutch, and these wedges of oil push the roller bearings toward the trailing edge of the indentations which contain the roller bearings. The roller bearings thus rotate against the trailing edge of the indentations, thereby creating friction between the roller bearings and the trailing edges. This friction both retards rotation of the inner and outer race relative to each other and inroduces wear of the roller bearings and the trailing edges of the indentations. It is thus a further object of the present invention to provide a one-way roller bearing clutch with means to prevent the roller bearings from abutting either of the races when the clutch is operated in the rotation direction.

When conventional one-way roller bearing clutches are rotated to the lock position from the rest position, a substantial angle of rotation must occur before the clutch locks. This is due to the fact that the roller bearings of the clutch must be rotated on their respective inclined planes in order to engage the inner and outer races. It is a further object of the present invention to provide a roller bearing one-way clutch in which the angular rotation of the inner and outer races relative to each other from the rest position to the lock position is minimized.

These and further objects of the present invention will be readily apparent from the following disclosure, particularly when viewed in the light of the drawings, in which:

FIGURE 1 is a vertical sectional view of a one-way clutch constructed according to the teachings of the present invention, the section being taken along the line 1—1 of FIGURE 2;

FIGURE 2 is a sectional view taken along the line 2—2 of FIGURE 1;

FIGURE 3 is a sectional view taken along the line 3—3 of FIGURE 1; and

FIGURE 4 is a sectional view taken along the line 4—4 of FIGURE 2.

As illustrated in the figures, the clutch has an inner race 10, a roller bearing assembly 12 disposed coaxially about the inner race 10, and an outer race 14 disposed about the roller bearing assembly 12. If the clutch assembly is to be used as a backstop, a conventional manner of use is to anchor the outer race 14, thereby preventing rotation of the inner race in one direction but permitting rotation in the opposite direction. However, if the clutch is to be used to transmit power in only one direction, both the outer and inner races are provided with means to couple them to shafts. As illustrated in FIGURE 1, the inner race 10 is a hollow cylinder, and its inner cylindrical surface is provided with teeth 16 for engaging a splined shaft 17.

The outer surface of the inner race 10 is provided with a plurality of indentations 18. From the point of view of the operability of a one-way clutch, these indentations could have been provided on the inner surface of the outer race 14. Each of the indentations 18 is provided with two flat surfaces, a leading surface 20 and a trailing surface 22 which is disposed essentially at a right angle relative to the leading surface 20. The leading surface 20 of each indentation 18 is disposed at an angle less than 15 degrees relative to the tangential plane at the intersection of the outer surface of the inner race 10 and the leading surface 20 of the indentation 18. Each of the indentations 18 is also provided with a groove 24 extending across the leading surface 20 of the indentation 18 immediately adjacent to the trailing surface 22 thereof for the purpose of permitting free flow of oil.

A roller bearing 26 is disposed between each indentation 18 of the inner race 10 and the outer race 14. The roller bearings 26 have a diameter larger than the distance between the outer surface of the inner race 10 and the inner surface of the outer race 14, and smaller than the distance between the leading surface 20 of the indentations 18 of the inner race 10 at a distance from the trailing surface 22 of the indentation approximately equal to the radius of the roller bearing to the inner surface of the outer race 14. In this manner, the roller bearings 26 are free to rotate when disposed adjacent to the trailing surface 22 of the indentations 18, but wedged between the inner race 10 and outer race 14 when rolled away from the trailing surface of the indentations of the inner race 10.

As stated above, the roller bearings 26 are mounted in an assembly, designated 12, and each of the roller bearings 26 is separated from adjacent roller bearings by a cage member 30 which has cylindrical surfaces 32 confronting each of the adjacent roller bearings 26 which conform to the roller bearings. Also, each of the cage members 30 is interconnected at its ends by an end ring 34, the end rings 34 and cage members 30 maintaining each of the roller bearings 26 in proper position relative to the inner race 10. The cage members 30 and end rings 34 form a cage for each of the roller bearings 26 and are thus means for limiting the motion of the roller bearings to radial planes separated by fixed angles. It is to be noted, that the roller bearings 26 are free to move a small distance along these radial planes since only the concave surfaces 32 of the cage members 30 retain them in position.

The inner race 10 is provided with two pairs of parallel slots 36 and 38. These slots 36 and the slots 38 are disposed parallel to each other in the same indentation 18, respectively, on opposite sides of the outer surface of the inner race 10 normal to the axis of the inner race 10. Also, the slots 36 are disposed in indentations 18 on opposite sides of the axis of the inner race 10 from the slots 38. A stop lug 40 is secured to the roller bearing assembly 12 confronting each of the slots 36 and 38, and the stop lug 40 is provided with an inwardly protruding portion 42 which is slidably accommodated within the slot 36 or 38. In addition, each stop lug 40 is provided with an inwardly protruding tooth 44 which is adapted to abut the trailing edge of the indentation carrying the slot 36 or 38. The slots 36 are thus disposed adjacent to the end rings 34 of the roller bearing assembly 12 at opposite ends of the same roller bearing 26, and the slots 38 are likewise disposed adjacent to the end rings 34 aligned with the same roller bearing 26.

The stop lugs 40 have two functions. When the clutch is operated in the direction of rotation, the teeth 44 of the stop lugs 40 abut the trailing surface 22 of the indentations 18 to limit the distance by which the roller bearings 26 may travel down the inclined planes or leading surfaces of the indentation 18, thus preventing the roller bearings 26 from abutting the trailing surfaces 22 of the indentations 18. In this manner, friction between the trailing surfaces of the indentations and the roller bearings 26 is substantially eliminated. Also, since the protruding portions 42 of the stop lugs 40 are disposed within the slot 36, axial motion of the roller bearing assembly 12 relative to the inner race 10 is eliminated, thus assuring alignment of the roller bearing assembly 12 and the inner race 10. Since the roller bearing assembly 12 is in essence keyed to the inner race 10, the only necessary contact between the roller bearing assembly 12 and the outer race 14 is through the roller bearings 26. Hence, friction between the inner and outer races in the direction of rotation is minimized.

A pair of coil springs 46 are disposed on opposite sides of the axis of the inner race 10 on each side thereof to spring bias the roller bearing assembly 12 relative to the inner race 10 toward the locking position in order to insure engagement of the roller bearings 26 between the leading surfaces 20 of the indentations 18 and outer races 14 when the clutch is in the rest position. The coil springs 46 have one end anchored within a bore 48 in the trailing surface 22 of indentations 18 on opposite sides of the axis of the inner race. The other end of the coil springs 46 is secured about a bolt 50 which is secured to the roller bearing assembly 12. The coil springs 46 form means to bias the rollers toward the intersection of the leading surface 20 and the outer surface of the inner race, and as a result, the "play" between the rest position of the clutch and the lock position of the clutch is greatly reduced.

While the end rings 34 may be secured to the roller cages 30 in any conventional manner, the applicant has found that a simple and very suitable way to accomplish this is to employ the bolts 50 for this purpose. The bolts 50 extend through the end rings 34, the cage members 30, and terminate in nuts 52 at the opposite end. In like manner, the bolts 50 may be employed to secure the stop lugs 40 to the roller bearing assembly 12.

The figures illustrate the clutch employed as a backstop mechanism. Hence, the outer race 14 is anchored to the mounting structure for the equipment employing the backstop mechanism by means not illustrated. The equipment shaft 17 which is provided with a backstop may be rotated upon bearings 54 and 56 which are mounted to the stationary outer race 14.

Those skilled in the art will readily devise modifications and improvements within the scope of the teachings of this disclosure. It is therefore intended that the present invention be not limited by the foregoing disclosure, but rather only by the appended claims.

The invention claimed is:

1. An assembly for a one-way clutch comprising, in combination, a generally cylindrical inner race having a plurality of spaced indentations on its outer surface, each indentation having a flat surface extending from the surface of the inner race parallel to the axis of the inner race, each of said flat surfaces being at approximately the same angle relative to the radial plane passing through the line of intersection of the flat surface and the outer surface of the inner race, and a trailing surface disposed approximately on a radial plane, a roller being assembly including a roller bearing confronting each of the indentations and a hollow cylindrical cage having a slot for each roller bearing to maintain the roller bearings on radial planes separated by fixed angles, and a stop lug secured to the cage confronting one of the above said indentations of the inner race having a tooth protruding toward the inner race adapted to abut the trailing surface of the indentation.

2. An assembly for a one-way clutch comprising the elements of claim 1 wherein the inner race is provided with a slot normal to the axis of the inner race and confronting the stop lug, and the stop lug is provided with a protruding portion slidably disposed within the slot to maintain the cage in axial alignment with the inner race.

3. A one-way clutch comprising, in combination, a generally cylindrical inner race having a plurality of spaced indentations on its outer surface, each indentation having a flat surface extending from the surface of the inner race parallel to the axis of the inner race, each of said flat surfaces being at approximately the same angle relative to the radial plane passing through the line of intersection of the flat surface and the outer surface of the inner race, and a trailing surface disposed approximately on a radial plane, a roller bearing assembly including a roller bearing confronting each of the indentations and a hollow cylindrical cage having a slot for each roller bearing to maintain the roller bearings on radial planes separated by fixed angles, a stop lug secured to the cage confronting one of the above said indentations of the inner race having a tooth portruding toward the inner race adapted to abut the trailing surface of the indentation, and an outer cylindrical race disposed coaxially about the inner race and separated therefrom by a distance less than the diameter of the roller bearings and greater than the sum of the diameter of the roller bearings and the depth of the indentations.

4. A one-way clutch comprising a generally cylindrical inner race having a plurality of spaced indentations on its outer surface, each indentation having two flat surfaces parallel to the axis of the inner race, one of said surfaces forming a leading surface and being disposed at an angle less than 15° relative to the radial plane intersecting said surface at the outer surface of the inner race, and the second surface forming a trailing surface and being at approximately a right angle relative to the first surface, said inner race also having at least one pair of parallel spaced slots disposed in an indentation of the outer surface thereof normal to the axis thereof, a roller bearing assembly including a roller bearing confronting each of the indentations having a length shorter than the distance between the slots, a cage member disposed between adjacent roller bearings having conforming surfaces confronting each roller bearing, and a pair of end rings secured to opposite ends of each cage member, a stop lug secured to the roller bearing assembly extending inwardly therefrom into each slot, said lug having a tooth confronting the trailing surface of one of the above said indentations and an inwardly extending portion disposed within the slot, a cylindrical outer race disposed coaxially about the roller assembly at a distance less than the diameter of the rollers from the inner race and more than the diameter of the rollers from the deepest portions of the indentations of the inner race, and a coil spring anchored within the inner race and the roller bearing assembly biasing the roller bearing against the leading surfaces of the inner race.

References Cited in the file of this patent

UNITED STATES PATENTS

| | | |
|---|---|---|
| 1,583,530 | De Lavaud | May 4, 1926 |
| 2,068,462 | Nardone | Jan. 19, 1937 |
| 2,705,552 | Cross | Apr. 5, 1955 |
| 2,826,096 | Hoge | Mar. 11, 1958 |